(12) United States Patent
Robbins et al.

(10) Patent No.: US 8,818,879 B2
(45) Date of Patent: Aug. 26, 2014

(54) DATA ELEMENT SPECIFIC TRANSACTION ROUTING

(75) Inventors: Peter Robbins, Centennial, CO (US); Keith Newbrough, Parker, CO (US)

(73) Assignee: First Data Corporation, Greenwood Village, CO (US)

( * ) Notice: Subject to any disclaimer, the term of this patent is extended or adjusted under 35 U.S.C. 154(b) by 1530 days.

(21) Appl. No.: 11/849,670

(22) Filed: Sep. 4, 2007

(65) Prior Publication Data

US 2009/0063291 A1    Mar. 5, 2009

(51) Int. Cl.
*G06Q 30/00* (2012.01)

(52) U.S. Cl.
USPC .......................................... 705/26.1; 705/27.1

(58) Field of Classification Search
USPC ................................................. 705/26.1–27.2
See application file for complete search history.

(56) References Cited

U.S. PATENT DOCUMENTS

| | | | |
|---|---|---|---|
| 6,226,624 B1 | 5/2001 | Watson et al. | |
| 6,847,947 B1 | 1/2005 | Kambour et al. | |
| 2004/0117302 A1 | 6/2004 | Weichert et al. | |
| 2005/0086169 A1* | 4/2005 | Wells et al. | 705/44 |
| 2005/0216424 A1* | 9/2005 | Gandre et al. | 705/75 |
| 2006/0242085 A1 | 10/2006 | Jones et al. | |
| 2007/0073615 A1 | 3/2007 | Marchesi | |
| 2007/0233597 A1* | 10/2007 | Petersen et al. | 705/39 |
| 2008/0270298 A1* | 10/2008 | McElroy et al. | 705/39 |

OTHER PUBLICATIONS

Entenman, C. (1995). Are you ready for the purchasing card? Business Credit, 97(10), 29. Retrieved from http://search.proquest.com/docview/230155426?accountid=14753.*
PCT International Search Report and Written Opinion mailed Nov. 18, 2008, International Application No. PCT/US2008/075215, 11 pages.

* cited by examiner

*Primary Examiner* — Kathleen G Palavecino
(74) *Attorney, Agent, or Firm* — Kilpatrick Townsend & Stockton LLP (57) ABSTRACT

Systems and methods for determining a least cost transaction scheme for a merchant is provided according to one embodiment of the invention. The least cost transaction scheme may be determined at a point of sale device or at a host computer system that communicates with a point of sale device. The least cost transaction scheme may depend on a standard industrial classification (SIC) code associated with the merchant and a transaction amount. In one embodiment the transaction amount and merchant ID is sent to a host computer system. Based on the merchant ID and the transaction amount the host computer system determines a fees for a plurality of transaction schemes. From the plurality of transaction schemes, a least cost transaction scheme is selected and a user is prompted to use the least cost transaction scheme to tender the transaction.

12 Claims, 5 Drawing Sheets

DATA ELEMENT SPECIFIC TRANSACTION ROUTING

BACKGROUND OF THE INVENTION

The present invention relates to systems and methods for determining the lowest cost transaction scheme, and more particularly to determining lowest transaction cost scheme based on the merchant type, the transaction amount and the fees associated with various transaction schemes. In one aspect, the invention is particularly useful where a least cost transaction is determined and a customer is prompted to tender a transaction using the least cost transaction.

Due to increased share of electronic transactions in the marketplace, the cost and volume of such transactions have become a concern for merchants and processors. In performing commercial electronic transactions, merchants and processors have many networks from which to choose, each associated with various transactional costs and fees that may depend on, at least, such things as bank identification number (BIN), the standard industry classification (SIC) code associated with the vendor, and/or the transaction amount. Vendors and merchants are at the mercy of their customers who may choose to tender a transaction with a high cost transaction scheme that is more expensive to the merchant than other schemes.

Consequently, there is a need for improved systems and methods for determining the transaction processing scheme that incurs the lowest cost to the merchant.

BRIEF SUMMARY OF THE INVENTION

A method for determining a least cost transaction scheme is disclosed according to one embodiment of the invention. The method may be initiated at a point of sale (POS) device operated by a merchant and/or may be carried out at the POS device or at a host computer system or network. The method analyzes the transaction amount and the standard industrial classification (SIC) code associated with the merchant and determines the processing cost incurred by the merchant based on at least these factors for a variety of transaction processing schemes. These transaction processing schemes may include payment using a credit and/or debit card, payment with a check and/or cash, payment with a stored value card or payment with a presentation instrument. The transaction schemes may include a variety of presentation instruments each issued from a different financial institution and/or a different product of various financial institution and may be stored in a computer readable table. The method may then determine which of the various transaction schemes will incur the least processing cost for the merchant. The consumer may then be prompted, either through the POS device, at a webpage or through a merchant representative to use the least cost transaction scheme.

For example, a consumer at a grocery store may approach a clerk at a check out counter with a cartful of groceries. Once the groceries have been totaled by the clerk, for example, the POS device will calculate a least processing cost transaction scheme based on the SIC code for the grocery and the transaction amount. For instance, the least cost transaction scheme may be a credit card from a specific issuer. As such, the POS device and/or the clerk may recommend to the consumer or ask the consumer to use the specific credit card.

As another example, a consumer may select to purchase an item or items from an online merchant. Once the transaction amount has been totaled including, for example, tax and shipping fees, the online merchant may query a financial institution host computer system for the presentation instrument with the lowest processing cost. The query may include the transaction amount and the SIC code related to the online merchant. The financial institution host computer system determines the presentation instrument with the lowest processing cost and communicates this presentation instrument to the online merchant. In doing so, the financial institution host computer system may use the BINs of various presentation instruments to determine each presentation instruments processing cost. The online merchant may then request payment from the consumer with the presentation instrument with the lowest processing cost through a web page. Of course, the online merchant may also provide options to tender the transaction with alternative presentation instruments or other transaction schemes.

The methods described above may also provide a second least cost transaction scheme or second lowest processing cost presentation instrument. The consumer may be prompted to use the second least cost transaction scheme or the second lowest processing cost presentation instrument in lieu of the first least cost transaction scheme or first lowest processing cost presentation instrument. The first and/or second transaction schemes may include a credit card payment, signature debit card payment, PIN debit card payment, a gift card, a stored value card, cash, and/or check. The methods may also use bank identification numbers (BINs) to determine the processing costs of various different presentation instruments.

Another method for determining a least cost transaction scheme at a host computer system is disclosed according to another embodiment of the invention. The method may include receiving a transaction amount and merchant ID from a merchant system and looking up the merchant's SIC code based on the merchant ID. The host computer system may then calculate a processing cost for each of a plurality of transaction schemes based at least in part on the transaction amount and the SIC code. The host computer system may then determine a least cost transaction scheme from the plurality of transaction schemes and sends the least cost transaction scheme to the merchant from the host computer system. The plurality of transaction schemes may include a credit card payment, signature debit card payment, PIN debit card payment, a gift card, a stored value card, cash, and/or check.

Another method for determining a least cost transaction scheme for an online purchase is disclosed according to another embodiment of the invention. The method comprises providing a transaction table array that includes a series of tables. Each table may include a list of transaction schemes sorted based at least in part on network processing fee amounts, each table is generated based at least in part on a transaction amount, and the series of tables is based at least in part on SIC codes. A web server may receive a transaction amount from a consumer purchasing items or services over the Internet. The appropriate transaction table may then be selected from the transaction table array based at least in part on the amount of the transaction and a merchant SIC code. The merchant's least cost transaction scheme is determined from the plurality of transaction schemes. A payment may then be requested from the consumer on a webpage using the least cost transaction scheme.

DETAILED DESCRIPTION OF THE INVENTION

In accordance with the present invention, systems and methods for providing least cost transaction scheme for a merchant is provided. A merchant may include a retailer, restaurant, a web page, a catalogue, etc. Thus, the merchant may include any person or entity that accepts payment in return for goods or services. The systems and methods of the invention generally comprise selecting a least cost transaction scheme for an electronic transaction based the transaction amount, the SIC code and/or BINs associated with various cards. The systems and methods of the invention are useful for least cost routing of PIN-secured, signature-secured, and other payment types supported by electronic debit and/or credit networks known in the art.

In a first aspect, the invention generally provides an array of transaction tables located at a host or point of sale (POS) device. The transaction table array includes a series of transaction tables, wherein each transaction table in the array includes a list of transaction schemes sorted by transaction fee amount. As may be recognized by those skilled in the art, transaction fee amount may be based on a percentage of the transaction amount, may be based on a percentage of the transaction amount plus a flat fee, may be based on the SIC code associated with the merchant, may be based on the BIN associated with a transaction card, etc. However, the invention is not so limited, and any network fee arrangement known in the art may be used to generate the transaction table arrays of the invention.

By way of background, some transactions have previously been routed based on tables that were generated based on an average ticket amount, and used as an estimate, often resulting in the selection of an inefficient network. However, in accordance with the present invention, the transaction table arrays are generated based on a specific transaction amount, the merchant SIC code, and/or the BIN associated with each transaction scheme. Specific transaction tables within a transaction table array are then used on a transaction by transaction basis to select the lowest cost without relying on general estimates, thereby eliminating the inefficiencies of the prior art. The consumer may then be prompted to use the least cost transaction scheme to tender the transaction.

A separate transaction table may be generated based on, at least in part, a discrete predetermined transaction amount. For instance, a separate transaction table may be generated for a 1 penny transaction amount up to, e.g., $500 transaction, etc., depending on the merchant type as determine by the merchant SIC code. The series of transaction tables may be based on a predetermined transaction table amount interval up to a cap amount. For instance, 1 cent, 5 cent, 10 cent, 25 cent, 50 cent, 1 dollar, 2 dollar, 5 dollar, 7 dollar, 10 dollar, etc. intervals, and may range from a, e.g., $0.01, $0.25, $1 transaction amounts up to a cap amount, e.g., $500, or higher, as set by the transaction scheme.

The transaction tables may also be generated based in part on merchant type as determined by the SIC code associated with the merchant. Typical merchant types include grocery merchants, retail merchants, quick service restaurant merchants, supermarket, petroleum, etc, as known in the industry. For instance, a separate transaction table may be generated for a grocery merchant for 1 penny up to a cap amount, e.g., $500. Various transaction amount intervals may be used, e.g., including 1 cent, 5 cent, 10 cent, 25 cent, 50 cent, 1 dollar, 2 dollar, 5 dollar, etc., intervals. As recognized by those skilled in the art, certain larger merchants may have individual or negotiated transaction table amounts which differ from the merchant type standard.

The transaction tables may alternatively, or may additionally, be generated based in part on the transaction scheme. Typical electronic transactions include credit card transactions, debit card transactions, automated teller machine transactions, flexible spending accounts, stored value cards, electronic funds transfer transactions, electronic check acceptance transactions, traditional check acceptance transactions, etc. However, any transaction that may be processed through transaction schemes may be used in the context of the invention. For instance, a separate transaction table may be generated for a debit card transaction at 1 penny up to a cap amount, e.g., $500; for a credit card transaction at 1 penny up to a cap amount, e.g., $500; for a electronic check acceptance transaction at a grocery merchant at 1 penny up to a cap amount, e.g., $500; a traditional check acceptance transaction at a clothing merchant at 1 penny up to a cap amount, e.g., $500; an automated teller machine transaction at a specialty merchant at 1 penny up to a cap amount, e.g., $500. Again, various transaction amount intervals may be used, e.g., including 1 cent, 5 cent, 10 cent, 25 cent, 50 cent, 1 dollar, 2 dollar, 5 dollar, etc., intervals.

The transaction tables may be generated on a periodic basis, or on a notice basis, when transaction scheme fees are revised. In this manner, dynamic transaction table arrays may be generated for use in the systems and methods of the inventions for least cost routing of electronic transaction, in a time efficient manner. The transaction tables may be located at a POS device, at a host device or on another network accessible device.

In other embodiments, the transaction tables may be generated on a real-time basis as the transaction information is processed. In such embodiments, the transaction table information may be generated based only on the specific transaction amount, and the networks may be ranked based on that specific amount. Generally, to facilitate real-time calculations, the transaction table array may be prepared with the desired formulas for calculating the fees, and the fees may then be calculated in real-time as the transaction amount is processed for least cost routing. The tables may also present the costs associated with cash and/or check transactions.

Figure 1:
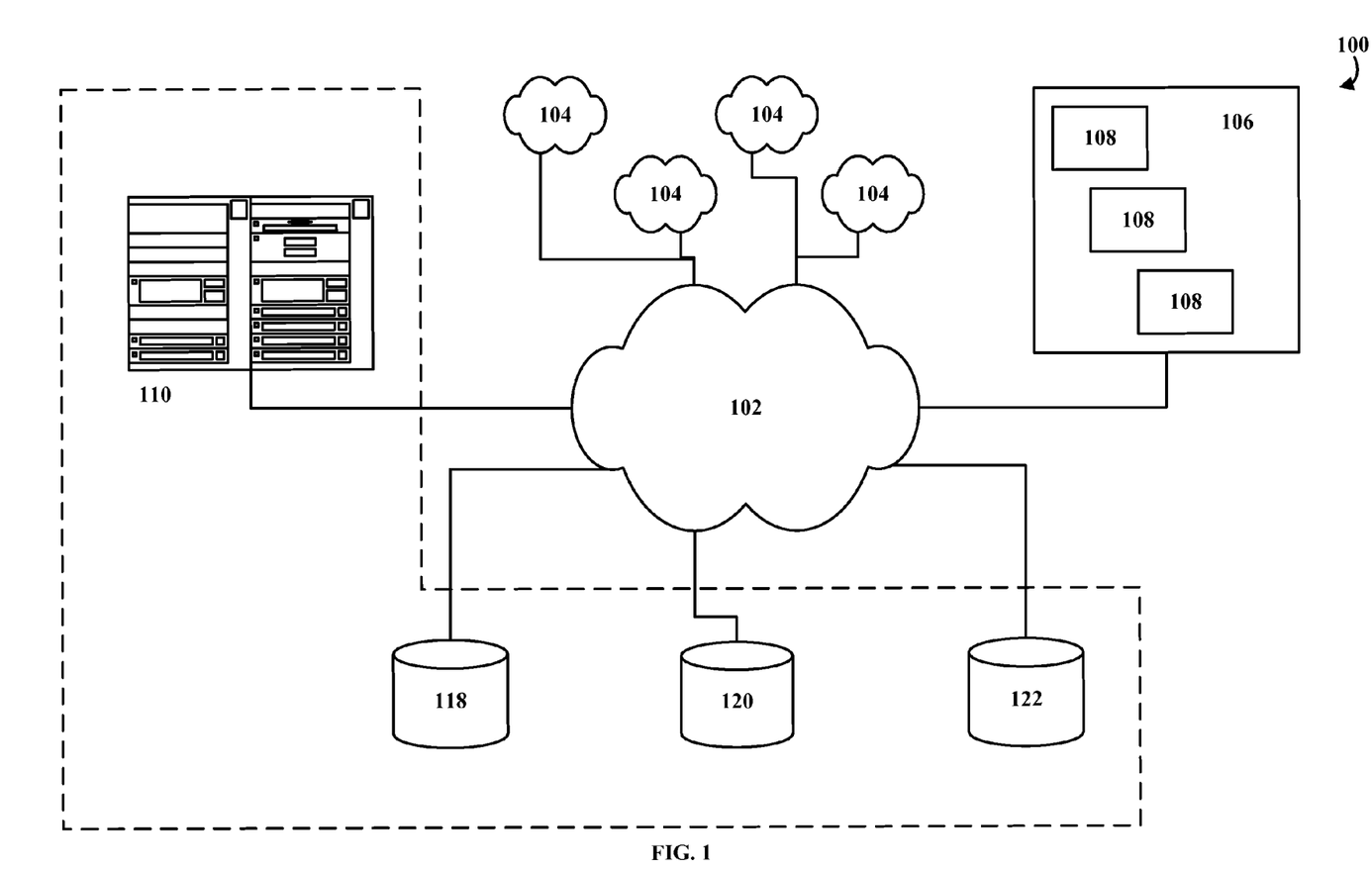
FIG. 1 shows a system for determining a least cost transaction scheme in accordance with embodiments of the invention.

Turning now to FIG. 1, a system 100 is illustrated for determining the least cost transaction scheme in accordance with embodiments of the invention. System 100 can be implemented in communications network environment (generally indicated by reference number 102). Communications network 102 can be any network capable of supporting electronic transactions, for example, debit and/or credit card transactions. Exemplary system 100 comprises electronic transaction terminals 108 located at a merchant location 106 in communication with computer/server 110. The computer/server 110 may include a host computer system at a financial institution or a processing computer system at a financial institution. Computer/server 110 is in turn in communication with one or more databases 118, 120, 122 and one or more transaction schemes 104. Merely by way of example, electronic transaction terminal 108, server 110, databases 118, 120, 122 and transaction scheme 104 may be in communication via any suitable communications network 102, such as a local area network, wide area network, the internet and/or any other telecommunications network, a wireless network and the like. Computer/server 110 may be located at the merchant location, or alternatively may be located at a service provider location. Likewise, as discussed in more detail herein, databases 118, 120, 122 may be located at the merchant location, or may alternatively be located at a service provider location.

Electronic transaction terminal 108 may be a point-of-sale terminal, an automated teller machine terminal, a cash register terminal, an electronic check verification terminal, part of a Internet based payment server, etc. However, the invention is not so limited, and any suitable electronic transaction terminal known in the art may be used in connection with the present invention.

Transaction scheme may be any known debit or credit scheme and may operate on any of the following networks/ systems, including STAR, PULSE, INTERLINK, MAESTRO, CU24, AFFN, ACCEL, EXCHANGE, NETS, SHAZAM, ATH, ALASKA OPTION, JEANIE, TEMPO PAYMENTS, CIRRUS, FASTBANK, INSTANT CASH, MINIBANK, MONEY NETWORK, PEAK, PLUS, NYCE, ALERT, VISA, MasterCard, DISCOVER, American Express, etc. However, the invention is not so limited, and any debit and/or credit network available in the geographic location of interest may be used in the context of the present invention.

In particular embodiments, system 100, server 110, and/or electronic transaction terminal 108 can, in some embodiments, comprise a plurality of processors. Each of the plurality of processors can perform one or more of the processing tasks discussed herein. Further, each of the plurality of processors can be in communication with one or more computer readable media, including, for instance disk drives, memory devices and the like which can include instructions executable by the processors to perform the functions discussed herein.

In accordance with various embodiments of the invention, system 100 can include one or more databases 118, 120, 122, etc. which can be used to store a variety of information related to the inventive methods discussed herein such as the transaction table array described above, a SIC table, a BIN table and/or a transaction amount table. Those skilled in the art will appreciate that although, for purposes of clarity, databases 118, 120, 122 are illustrated separately on FIG. 1, other embodiments of the invention might incorporate all of the stored data within a single database and/or organize data structures differently than as illustrated herein. Further, although illustrated as separate physical elements in FIG. 1, databases 118, 120, 122 may alternatively be housed within server computer 110 (as indicated by the dashed line in FIG. 1). As discussed herein, when reference is made to server computer 110 including or comprising a database, it is understood that the database may be within the computer housing itself, or may be a separate structure in communication with server computer 110.

In embodiments utilizing the information bus model discussed herein, the information discussed with respect to databases 118, 120, 122 may be pushed and/or pulled from the bus, allowing for data acquisition from a wide variety of sources. The term "database", therefore, should be interpreted to mean a collection of information rather than read as a limitation to a particular physical or logical structure or organization. Databases 118, 120, 122 can be in communication with server computer 110 either through network 104 (as illustrated on FIG. 1), through direct communication (e.g., SCSI connection, etc.) and/or through any other method known in the art, so long as server computer 110 can access the information stored within databases 118, 120, 122.

As will be discussed in more detail below, databases 118, 120, 122 may comprise various combinations of transaction tables for use to determine the least cost transaction scheme in accordance with the methods of the invention. By way of non-limiting example, databases 118, 120, 122 may comprise transaction tables listing transaction schemes sorted by transaction fee charged by the transaction scheme for the particular transaction for which the table has been generated. The tables may also take into account the SIC code of the merchant and the BINS of various transaction schemes.

Those skilled in the art will recognize that there are a variety of ways of storing composite information in a database, any of which can be implemented in accordance with various embodiments of the invention. Further, those skilled in the art will recognize that there are a variety of ways in which server computer 110 might interface with database 118, 120, 122. In a particular aspect server 110 can access information in database 118, 120, 122 on a periodic basis or on demand. Various standardized (e.g., OOBC, SQL, XML, etc.) and/or proprietary data access methodologies known in the art may be used to access databases 118, 120, 122. Further, data may either be pushed from a database or "pulled" by server 110.

Alternatively, databases 118, 120, 122 and/or server 110 can engage in a practice known in the art as "push-pull" data warehousing, whereby information can be shared with and/or pulled from another source, for example, using a relational database. Such data warehousing can be done within an enterprise or between multiple enterprises and can be performed using any of a variety of methods known to those skilled in the art including, merely by way of example, XML data transfers. In these and other ways, embodiments of the present invention, as discussed above, can interface with an information bus operation on an intra-company or inter-company basis, and can both pull information from that bus and push information to the information bus. Thus, systems in accordance with embodiments of the invention can easily integrate with other data management systems in the provider's network, for example by utilizing the information bus methodology described briefly herein and known to those skilled in the art.

In another aspect of the invention, methods for determining a lowest cost transaction scheme are provided. As mentioned above, the methods generally involve providing a transaction table array and determining a lowest cost transaction scheme from the transaction table array for a specific electronic transaction. Certain embodiments will be discussed in more detail below with reference to FIGS. 2 and 3.

Figure 2:
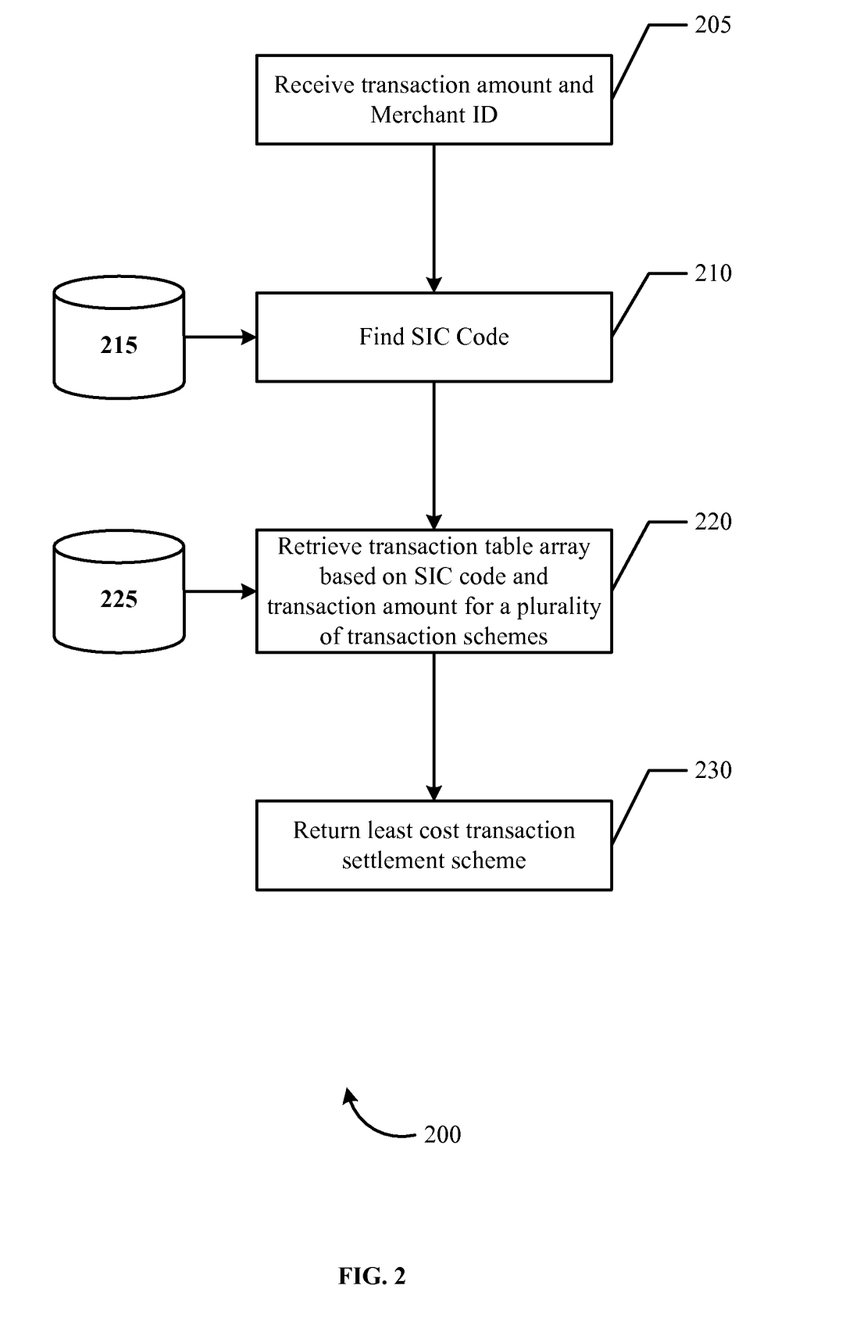
FIG. 2 shows a flowchart for determining a lowest cost transaction scheme according to one embodiment of the invention.

Turning now to FIG. 2, a method 200 is illustrated for determining a lowest cost transaction scheme. Although for ease of description, method 200 will be described by reference to system 100, those skilled in the art will understand that methods in accordance with various embodiments of the invention are not limited to any particular hardware or physical structure(s). In accordance with exemplary method 200, a method for determining a lowest cost transaction scheme is provided. Generally, the method involves at block 205, receiving a transaction amount for an electronic transaction.

At block 210, a transaction terminal (108) in response to a transaction between a consumer and a merchant may receive a transaction amount. The transaction terminal may include a point of sale (POS) device. The transaction terminal (108) may communicate the transaction amount and the merchant ID to the server/computer (110). At block 210, the server/computer (110) may then determine the SIC code associated with the merchant using a SIC code database 215. Alternatively, the North American Industry Classification System, the International Standard Industrial Classification, the Global Industry Classification Standard, and/or the United Kingdom Standard Industrial Classification of Economic Activities may be used instead of the SIC code.

The server may then select an appropriate transaction table from the transaction table array 225 based at least on the amount of the transaction and/or the SIC code of the merchant. More particularly, server/computer (110) may be configured, e.g., with computer implementable code capable of analyzing, e.g., the transaction amount, and rounding the transaction amount to the next highest transaction interval for which a transaction table has been generated. Server/computer (110) may then select transaction table corresponding to that transaction amount, i.e., the transaction table at the rounded-up transaction amount, as the appropriate transaction table for further processing. In certain embodiments, the transaction table may also be selected, and the transaction analyzed, based on at least merchant type and/or transaction type if desired. Moreover, some large merchants may have negotiated transaction amounts. The merchant ID may then be used to determine the merchant negotiated transaction fees.

As described above, each table is sorted by transaction schemes based on network fee amounts, each table may be generated based on at least a discrete predetermined transaction amount, and the series of tables is based on a predetermined transaction table amount interval up to a cap amount. The transaction tables may be generated at intervals such as, 1 cent, 5 cent, 10 cent, 25 cent, 50 cent, 1 dollar, 2 dollar, 5 dollar, 7 dollar, 10 dollar, etc. intervals. Further, each table may also be generated based on merchant type, such as grocery merchant, clothing merchant, specialty merchant, banking merchant, restaurant merchant, etc. Alternatively, or additionally, each table may be generated based on transaction type, the merchant SIC code, such as credit card transaction, debit card transaction, cash transaction, check, cash transactions, check, automated teller machine transaction, electronic funds transfer transaction, electronic check acceptance transaction, traditional check acceptance transaction, etc.

Once the appropriate transaction table is selected from the transaction table array based on the transaction amount and the SIC code of the merchant, at block 210, server/computer (110) determines the lowest cost transaction scheme from the selected transaction table to thereby determine the lowest cost transaction scheme for the transaction. By way of example, server/computer (110) may be configured, e.g., to include computer implementable code that is capable of performing table look up functions to determine the transaction scheme with the lowest associated network fee listed in the selected transaction table. The server/computer (110) may then communicate the least cost transaction scheme to the transaction terminal 108).

In certain embodiments, method 200 may continue by having the server/computer (110) determine the availability of the first selected lowest cost transaction scheme for the transaction, and selects the next lowest cost transaction scheme that is available if the first selected lowest cost transaction scheme is not available. The availability check may continue down the list of transaction schemes until the lowest cost transaction scheme that is available is determined. By way of example, the first selected lowest cost transaction scheme may not be available for any variety of reasons known in the art, such as the selected transaction scheme not being available for access by one or more of the parties to the electronic transaction, the selected transaction scheme experiencing technical difficulties, the communications network experiencing technical difficulties, etc.

Figure 3:
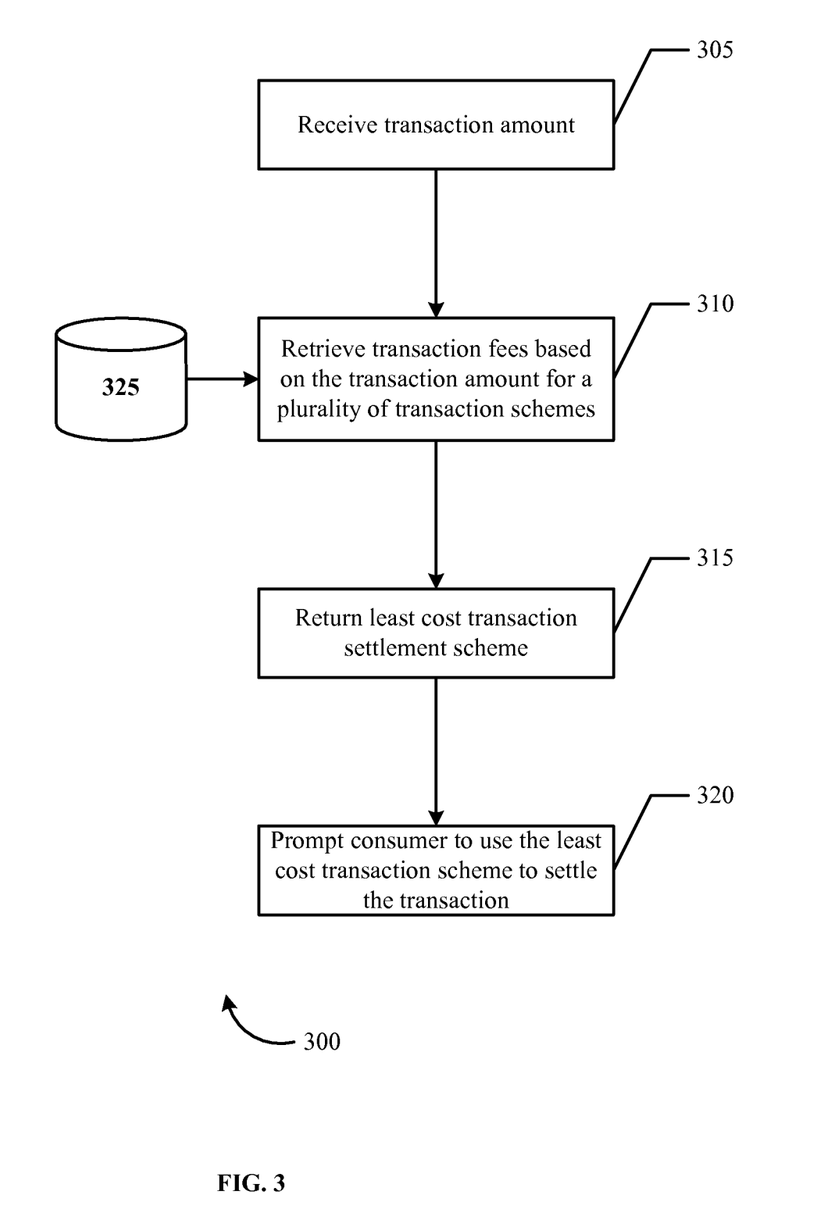
FIG. 3 shows a flowchart for determining a lowest cost transaction scheme at a transaction terminal according to one embodiment of the invention.

Turning now to FIG. 3, a method 300 is illustrated for determining a lowest cost transaction scheme at a transaction terminal (108). Again, although for ease of description, method 300 will be described by reference to system 100, those skilled in the art will understand that methods in accordance with various embodiments of the invention are not limited to any particular hardware or physical structure(s). In accordance with exemplary method 300, a method for determining a lowest cost transaction scheme is provided, wherein method 300 generally includes at block 305, receiving at the transaction terminal (108) the transaction amount. In some embodiments, the transaction amount is calculated at the transaction terminal (108).

At block 310, the transaction terminal (108) retrieves the transaction fees for a plurality of transaction schemes from the transaction table array 325 based on the transaction amount. More particularly, the transaction terminal (108) may be configured, e.g., with computer implementable code capable of analyzing, e.g., the transaction amount, and rounding the transaction amount to the next highest transaction interval for which a transaction table has been generated. The transaction terminal (108) may then select the transaction table corresponding to that transaction amount, i.e., the transaction table at the rounded-up transaction amount, as the appropriate transaction table for further processing.

The transaction table array in this embodiment is stored at the transaction terminal (108). Each table is sorted by transaction schemes based on network fee amounts, each table is generated based on at least a discrete predetermined transaction amount, and the series of tables is based on a predetermined transaction table amount interval up to a cap amount. The transaction tables may be generated at intervals such as, 1 cent, 5 cent, 10 cent, 25 cent, 50 cent, 1 dollar, 2 dollar, 5 dollar, 7 dollar, 10 dollar, etc. intervals. Further, the table stored at the transaction terminal is specific to the type of merchant using the transaction table, such as grocery merchant as determined by the SIC code, clothing merchant, specialty merchant, banking merchant, restaurant merchant, etc. Alternatively, or additionally, each table may be generated based on transaction type, such as credit card transaction, debit card transaction, cash transaction, check, automated teller machine transaction, electronic funds transfer transaction, electronic check acceptance transaction, traditional check acceptance transaction, etc. The transaction table may be arranged based on the BINS or international bank account numbers (IBANS). Thus, each transaction scheme may be included as a BIN or IBAN.

Moving on, method 300 may continue at optional block 315, where the least cost transaction scheme is selected from the plurality of transaction schemes. This least cost transaction scheme is then presented to the consumer as a suggested means to tender the transaction. For example, if, at block 315, a VISA debit card is the least cost transaction scheme, then, at block 320, the consumer is asked to tender the transaction using a VISA debit card.

In accordance with certain embodiments of the invention, when a transaction is processed for least cost routing, the merchant identification number associated with the merchant involved in the transaction is communicated to server/computer (110). The merchant number may be inputted into the system either automatically, e.g., from a point-of-sale device, cash register, automated teller machine, etc., or may be manually entered. By way of example, the merchant number may constitute a 16 byte number which uniquely identifies a merchant or merchant location, and may uniquely identify the merchant type. Initially, server/computer (110) may optionally determine whether the merchant identification number is valid. In determining whether the merchant number is valid, the server/computer (110) compares the merchant number with a merchant number file stored in one or more databases (118, 120, 122). In one embodiment, if the merchant number file shows that the merchant number is flagged for lowest cost routing analysis, then the system applies the present invention to the merchant transaction.

The merchant number file may include the following records: (1) the merchant number; (2) a transaction scheme list; (3) an optional transaction type list; (4) an optional merchant type; and (5) an optional lowest cost routing (LCR) flag. The transaction scheme list may be a byte record which is comprised of a list of transaction schemes that the identified merchant is capable of accessing and processing. The optional transaction type list may be a byte record which is a list of transaction types which the merchant is capable of processing. The optional transaction type may be a one to three byte codes to indicate the type of merchant.

In another aspect of the invention, various combinations of the methods illustrated in FIGS. 2 and 3 are envisioned. For instance, the specific order of the blocks shown in FIGS. 2 and 3 are not intended to be restrictive and in other embodiments, additional steps may be performed.

Figure 4A:
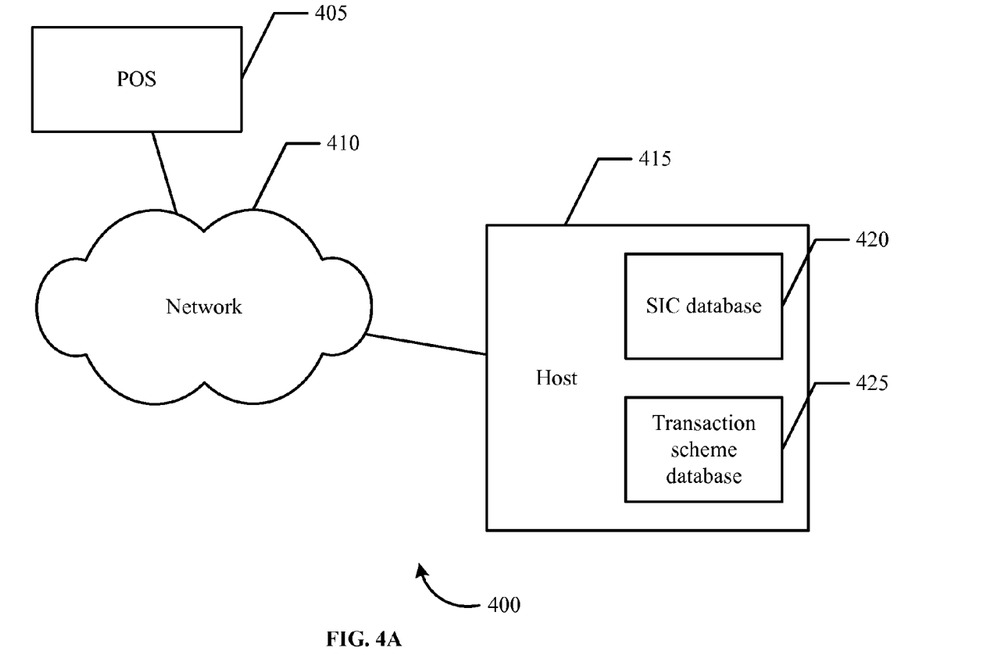
FIGS. 4A and 4B show exemplary transaction terminals in communication with a host processing system through a network according to embodiments of the invention.
Figure 4B:
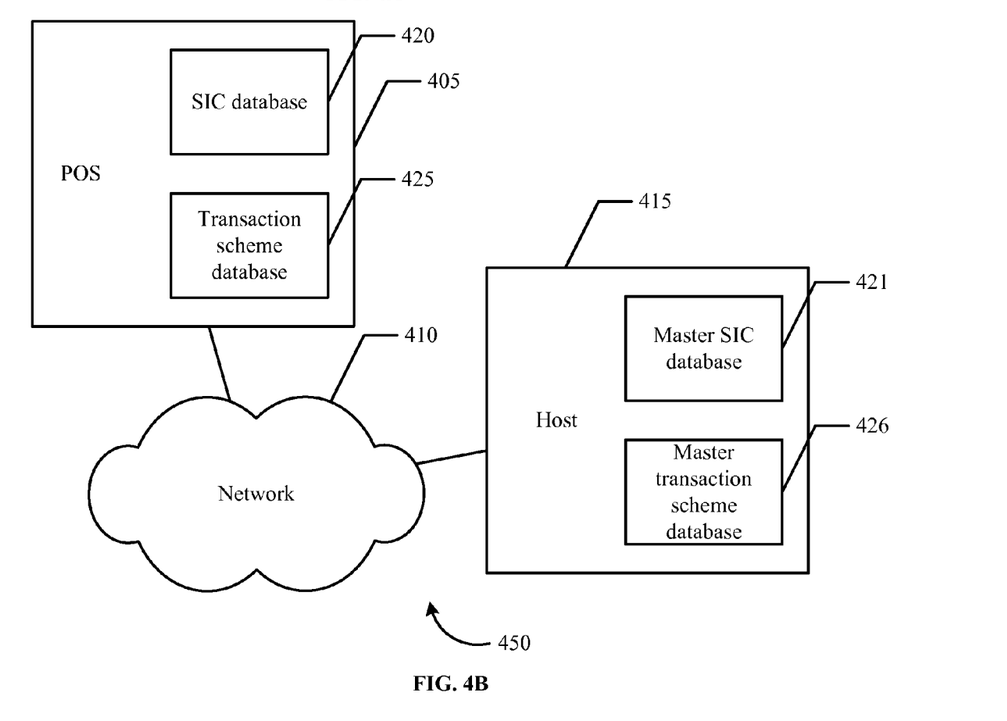

FIGS. 4A and 4B show exemplary POS devices (transaction terminals) 405 in communication with a host processing system 415 through a network 410 according to embodiments of the invention. As discussed above, the network 410 may include any of a variety of communication networks. In FIG. 4A the host computer system 415 maintains a SIC database 420 and a transaction scheme database 425. The host computer system 415, for example, may be located at a financial institution, a bank and/or a merchant location. In such a configuration, the host computer system 415 calculates the least cost routing using information received from the POS 405 and information in the databases 420, 425. The host computer system then communicates the least cost routing scheme back to the consumer. In other embodiments, the host computer system communicates the least cost routing scheme to the merchant. In the configuration shown in FIG. 4B, the POS device 405 includes a SIC database 420 and a transaction scheme database 425. Accordingly, the POS device 405 may calculate the least cost routing. The host computer system 415 may maintain a master SIC database 421 and a master transaction scheme database 426 that may be used to update the information in the databases maintained at the POS device 405. The information may be updated periodically or whenever an update is available.

Figure 5:
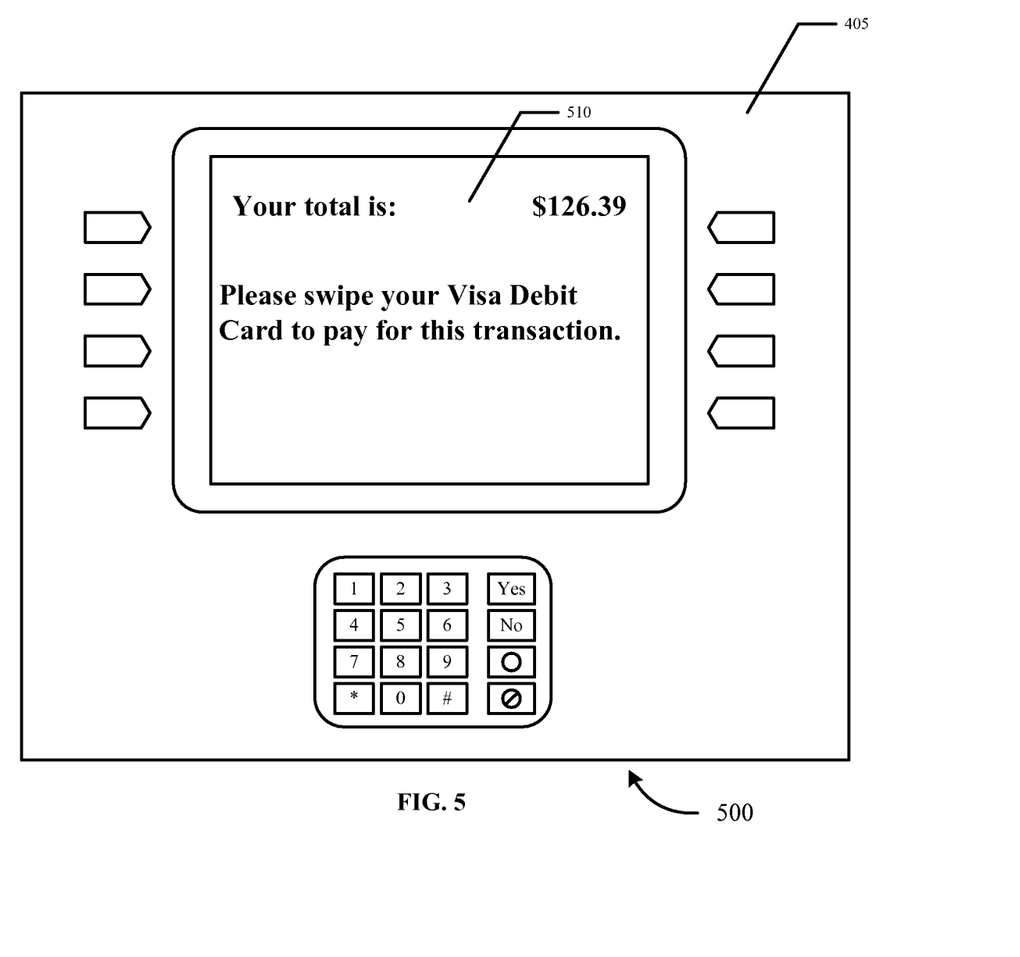
FIG. 5 shows a screen shot of an exemplary POS device prompting a consumer to use a least cost transaction scheme according to one embodiment of the invention.

FIG. 5 shows a screen shot 500 of an exemplary POS device 405 prompting a consumer to use a least cost transaction scheme according to one embodiment of the invention. The point of sale device includes a user interface. The user interface includes various buttons that a consumer may use to enter information. Moreover, the user interface includes a display 510 that may present information to a consumer and/or pose questions to the consumer. Once a transaction has been started and a transaction total is determined, in this case $126.39, the POS device 405 may determine the least cost processing scheme. This calculation may occur at the POS device 405 or at a processing system at a financial institution. Once the least cost processing scheme is established, the POS device prompts the consumer to use the least cost processing scheme. In this example, the least cost processing is associated with a Visa debit card.

The total transaction fee may include a set transaction fee and a interchange fee that is a percentage of the transaction amount. The total transaction fee may be found using Fee=$\text{Tx}_{Fee}+\text{P}_{interchange} \cdot \text{Tx}$. Where $\text{Tx}_{Fee}$ is the transaction fee, $\text{P}_{interchange}$ is the percentage of the transaction amount that is charged by the interchange and Tx is the transaction amount.

Tables 1-4 show examples of routing costs for various SICs and transaction amounts. The fees and percentages are used as exemplary only. The fees may vary of time, new fees may be added etc. As can be seen in the tables, the fees vary depending on the type of merchant and on the transaction amount. Table 1 shows the routing costs for transactions at a quick server restaurant (SIC 5814) for two transaction amounts $5.75 and $45.00. In every example shown, a stored value card has the least transaction cost. The transaction fees are based on the interchange percentage and the transaction fee. For example, a transaction using a PIN Debit on the STAR network will be charged $0.0725 for each transaction plus 1.25% of the transaction amount. For $5.75 the fee is $0.14 and for $45.00 the fee is $0.64. The second least transaction fees are bolded in the Table. Thus, for a $5.75 transaction, a PIN Debit and a standard signature debit card using the best qualifying interchange provide the least cost transaction fee of $0.14. Thus, a merchant may receive a transaction amount, look up transaction fees and percentages based on their SIC and then determine the lowest transaction fee. The merchant may then request the consumer use the transaction scheme with the least cost as tender. The merchant, may then as a consumer to pay for their meal at a quick serve restaurant with a PIN Debit or a standard signature debit card. For transactions at $45.00 a check has the lowest transaction fees.

Table 2 shows the transaction costs for various transaction schemes at a regular restaurant (SIC 5812). Table 3 shows the transaction costs for various transaction schemes at a supermarket (SIC 5511). Table 4 shows the transaction costs for various transaction schemes at a retail store (SIC 5300). In each of the tables, the second lowest transaction fee is bolded. The least cost scheme in every case is a stored value or prepaid card. Merchants may also set their results to screen out various forms of payment. For example, a merchant may not accept a certain type of credit card, checks, or interchanges then they can request that the fees for these types of payments schemes not be considered in determining the least cost scheme.

TABLE 1

Examples of routing costs for quick serve restaurants, SIC 5814

| 5814 Quick Serve Restaurant | Int. % | Tran. Fee | Trxn Fee $5.75 | Trxn Fee $45.00 |
|---|---|---|---|---|
| Standard credit card rates at best qualifying interchange | 1.7425% | $0.0473 | $0.15 | $0.83 |
| Standard signature Debit card rates at best qualifying interchange | 1.6425% | $0.0473 | $0.14 | $0.79 |
| PIN Debit (STAR) | 1.2500% | $0.0725 | $0.14 | $0.64 |
| Rewards Credit Cards | 1.7425% | $0.1073 | $0.21 | $0.89 |
| Stored Value Card/Prepaid Card | | $0.1000 | $0.10 | $0.10 |
| Check | | $0.2500 | $0.25 | $0.25 |

TABLE 2

Examples of routing costs for regular restaurants, SIC 5812

| 5812 Regular Restaurant | Int. % | Tran. Fee | Trxn Fee $5.75 | Trxn Fee $45.00 |
|---|---|---|---|---|
| Standard credit card rates at best qualifying interchange | 1.6325% | $0.1073 | $0.20 | $0.84 |
| Standard signature Debit card rates at best qualifying interchange | 1.2825% | $0.1073 | $0.18 | $0.68 |
| Rewards Credit Cards | 1.7425% | $0.1073 | $0.21 | $0.89 |
| Stored Value Card/Prepaid Card | | $0.1000 | $0.10 | $0.10 |
| Check | | $0.2500 | $0.25 | $0.25 |

TABLE 3

Examples of routing costs for supermarkets, SIC 5511

| 5411 Supermarket | Int. % | Tran. Fee | Trxn Fee $5.75 | Trxn Fee $45.00 |
|---|---|---|---|---|
| Standard credit card rates at best qualifying interchange | 1.3325% | $0.0573 | $0.13 | $0.66 |
| Std Sig Debit card rates at best qualifying interchange BELOW Max | 1.1225% | $0.1573 | $0.22 | |
| Std Sig Debit card rates at best qualifying interchange OVER Max | 0.0925% | $0.3573 | | $0.40 |
| PIN Debit (STAR) | | $0.2825 | $0.28 | $0.28 |
| Rewards Credit Cards | 1.7425% | $0.1073 | $0.21 | $0.89 |
| Stored Value Card/Prepaid Card | | $0.1000 | $0.10 | $0.10 |

TABLE 4

Examples of routing costs for retail, SIC 5300

| 5300 Retail | Int. % | Tran. Fee | Trxn Fee $5.75 | Trxn Fee $45.00 |
|---|---|---|---|---|
| Standard credit card rates at best qualifying interchange | 1.6325% | $0.1073 | $0.20 | $0.84 |
| Standard signature Debit card rates at best qualifying interchange | 1.1225% | $0.1573 | $0.22 | $0.66 |
| PIN Debit (STAR) | 0.7250% | $0.1925 | $0.23 | $0.52 |
| Rewards Credit Cards | 1.7425% | $0.1073 | $0.21 | $0.89 |
| Stored Value Card/Prepaid Card | | $0.1000 | $0.10 | $0.10 |
| Check | | $0.2500 | $0.25 | $0.25 |

In certain embodiments, method 300 may determine the availability of the first selected lowest cost transaction scheme for the transaction, and selects the next lowest cost transaction scheme that is available if the first selected lowest cost transaction scheme is not available. The availability check may continue down the list of transaction schemes until the lowest cost transaction scheme that is available is determined. By way of example, the first selected lowest cost transaction scheme may not be available for any variety of reasons known in the art, such as the selected transaction scheme experiencing technical difficulties, the communications network experiencing technical difficulties, etc.

Moreover, in the various embodiments of the invention the transaction may be an online transaction. In such a transaction, the merchant may prompt the consumer to use the least cost transaction scheme to tender the transaction on a payment web page. Also, the merchant's webpage may include the least cost transaction scheme at the top of a list of transaction schemes or as the first selection in a drop down menu. Alternatively, the merchant may present a payment page using the least cost transaction scheme and require the consumer to go to another web page to pay with an alternative payment scheme.

Further, it is understood that in certain aspects of the invention, the methods are subject to the rules of operation of the various transaction schemes as previously described. For instance, if required by network rules or agreement, the methods of the invention may select a transaction scheme based on network rule requires rather than LCR requirements, as previously described herein. In certain embodiments, the methods of the invention may comprise additional network rule checks to verify network rule compliance following table look-up. In other embodiments, the invention may take network rules into account when generating the various table arrays of the invention such that the LCR network priorities indicated in the tables reflect not only network fee considerations, but also network rule and regulation considerations.

In accordance with the methods of the present invention, selection of a lowest cost transaction scheme and least cost transaction scheme routing may be performed in a dynamic, yet time efficient manner. A traditional, static, over-arching fee table that does not take into account specific transaction parameters (e.g., merchant type, transaction type, subject of transaction, transaction amount, etc.), does not provide for dynamic, cost-efficient routing of electronic transactions. Although efficient from a time perspective, often such an approach will result in the selection of a less cost efficient transaction scheme. On the other hand, complex computational formulas for calculating the exact fees for multiple transaction schemes to select the lowest fee transaction scheme, although dynamic and accurate, is operationally inefficient and time consuming.

Through the use of the transactional table array described herein, the present invention provides the time-efficiency of a simple table look up approach, while at the same time providing the dynamic-accuracy of a computational methodology. The transactional table array of the present invention is generated off-line from the time-sensitive electronic transaction taking into account transaction parameters. Then, once time becomes of importance during processing of the electronic transaction, the transactional table array provides a mechanism for a simple table look-up with the added accuracy of a dynamic computational formula.

In this way, embodiments in the invention provide novel systems and methods for determining a lowest cost debit and/or credit network for an electronic transaction and for routing such transactions. The description above identifies certain exemplary embodiments for implementing the invention, but those skilled in the art will recognize that many modifications and variations are possible within the scope of the invention. Therefore, the invention is defined only by the claims set forth below.

What is claimed is:

1. A method for determining a least cost transaction scheme for a merchant, wherein the merchant is associated with a standard industrial classification (SIC) code, the method comprising:
   receiving, at a computer system having a processor, a transaction amount obtained from a point of sale device;
   calculating, at the computer system, a plurality of transaction fees that comprises a transaction fee for each of a plurality of transaction schemes, wherein each transaction fee is based at least in part on the transaction amount, the SIC code, one of the plurality of transaction schemes, and a bank identification number (BIN) associated with one of the plurality of transaction schemes;

updating, at the computer system, each transaction table from an array of transaction tables with the plurality of transaction fees for each of the plurality of transaction schemes;

accessing, at the computer system, a specific transaction table from the array of transaction tables, wherein the specific transaction table is selected based on the SIC code and the transaction amount, wherein each transaction table within the array of transaction tables associates a plurality of transaction schemes with the plurality of transaction fees;

determining, by the computer system, a least cost transaction scheme associated with the lowest transaction fee listed in the specific transaction table; and transmitting from the computer system to the point of sale device information usable by the point of sale device to prompt a consumer through the point of sale device to use the least cost transaction scheme.

2. The method according to claim 1, wherein the prompting comprises prompting the consumer to use a presentation instrument associated with the least cost transaction scheme.

3. The method according to claim 1, wherein the prompting comprises prompting the consumer to use the least cost transaction scheme on a webpage.

4. The method according to claim 1, further comprising:
determining a second least cost transaction scheme; and
communicating the second least cost transaction scheme to the consumer.

5. The method according to claim 1, wherein each of the plurality of transaction schemes is selected from the group consisting of: credit card payment, signature debit card payment, PIN debit card payment, stored value card payment, cash, electronic balance transfers, and check.

6. The method according to claim 5, wherein the credit card payment comprises a credit card payment from one of a plurality of credit cards.

7. The method according to claim 5, wherein the debit card payment comprises a debit card payment from one of a plurality of debit cards.

8. A method for determining a least cost transaction scheme at a host computer system, the method comprising:
calculating, at the host computer system, a plurality of transaction fees that comprises a transaction fee for each of a plurality of transaction schemes, wherein each transaction fee is based at least in part on a transaction amount, a standard industrial classification (SIC) code, one of the plurality of transaction schemes, and a bank identification number (BIN) associated with one of the plurality of transaction schemes;

maintaining an array of transaction tables, wherein each transaction table is selectable based on the SIC code and the transaction amount, and wherein each transaction table within the array of transaction tables associates the plurality of transaction schemes with the plurality of transaction fees;

updating, at the host computer system, each transaction table from the array of transaction tables with the plurality of transaction fees for the plurality of transaction schemes;

receiving the transaction amount and a merchant ID from a merchant at a host computer system;

looking up the merchant's SIC code based on the merchant ID at the host computer system;

accessing a specific transaction table from the array of transaction tables based on the SIC code and the transaction amount;

determining, by the host computer system, a least cost transaction scheme associated with the lowest transaction fee listed in the specific transaction table; and sending the least cost transaction scheme to the merchant from the host computer.

9. The method according to claim 8, wherein each of the plurality of transaction schemes is selected from the group consisting of: credit card payment, signature debit card payment, PIN debit card payment, stored value card payment, cash, electronic balance transfers, and check.

10. A method for determining a least cost transaction scheme for an online purchase, the method comprising:
calculating a plurality of transaction fees that comprises a transaction fee for each of a plurality of transaction schemes, wherein each transaction fee is based at least in part on a transaction amount, a standard industrial classification (SIC) code, one of the plurality of transaction schemes, and a bank identification number (BIN) associated with one of the plurality of transaction schemes;

providing a transaction table array comprising a series of transaction tables, wherein each transaction table is selectable based on the SIC code and the transaction amount, and wherein each transaction table within the transaction table array associates the plurality of transaction schemes with the plurality of transaction fees;

updating each transaction table within the transaction table array with the plurality of transaction fees for the plurality of transaction schemes;

receiving, at a host computer system, the transaction amount from a web server;

selecting, at the host computer system, an appropriate transaction table from the transaction table array based at least in part on the transaction amount and the SIC code;

determining, by the host computer system, the merchant's least cost transaction scheme from the plurality of transaction schemes; and sending a request for payment from a consumer using the least cost transaction scheme to the web server.

11. The method according to claim 10, wherein each of the plurality of transaction schemes is selected from the group consisting of: credit card payment, signature debit card payment, PIN debit card payment, stored value card payment, cash, electronic balance transfers, and check.

12. The method according to claim 10, further comprising:
determining a second least cost transaction scheme; and
requesting payment from the consumer on a webpage using the second least cost transaction scheme.

\* \* \* \* \*